May 11, 1926.
F. W. SCHALLER
SIGNAL FOR MOTOR VEHICLES
Filed Oct. 16, 1925
1,583,857
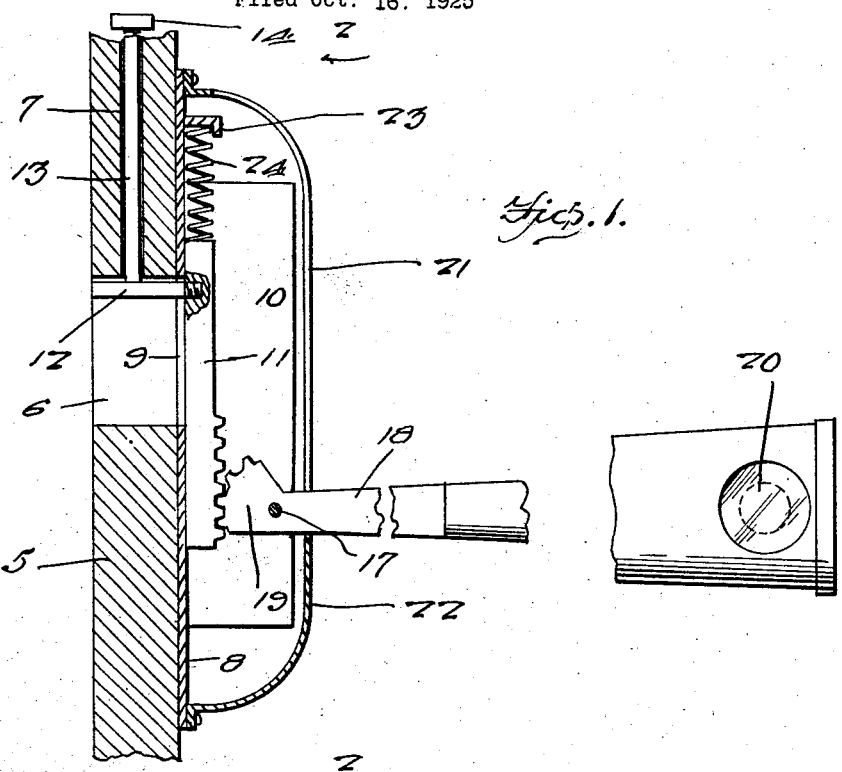
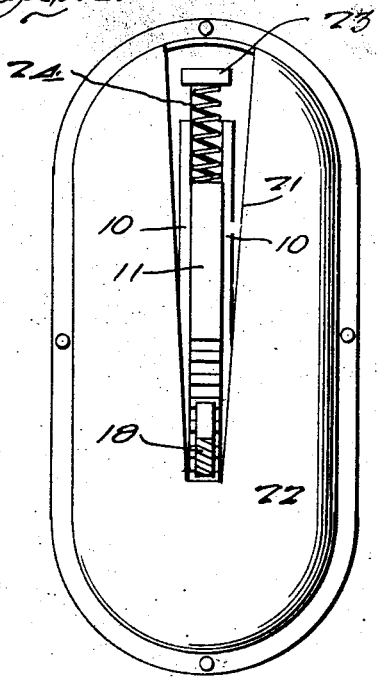
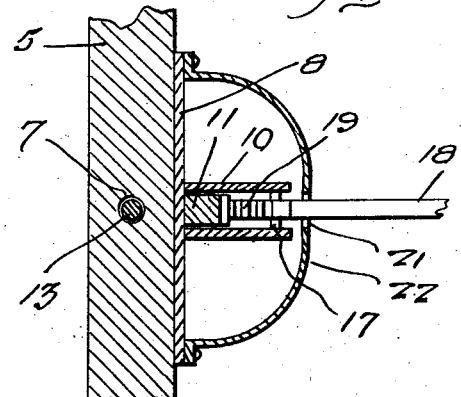
Inventor
F. W. Schaller Patented May 11, 1926.

1,583,857

UNITED STATES PATENT OFFICE.

FRED W. SCHALLER, OF RAWSON, OHIO.

SIGNAL FOR MOTOR VEHICLES.

Application filed October 16, 1925. Serial No. 62,774.

The present invention relates to certain new and useful improvements in motion and direction indicators for motor vehicles, and has particular reference to the provision of a manually operable signal device of this kind adapted for attachment to the side of an automobile body and including an actuating member which is within convenient reach of the driver of the automobile.

The primary object of the invention is to generally simplify and improve devices of the present kind.

Another object of the invention is to provide a simple and efficient means under the control of the chauffeur of an automobile for indicating to pedestrians and drivers of other vehicles the intention of the chauffeur to deviate from a straight course or to stop so as to avoid accidents otherwise caused from this source.

With the above general objects in view and others that will become apparent as the nature of the invention is better understood, the invention consists in the novel form, combination and arrangement of parts, hereinafter more fully described and claimed in connection with the accompanying drawings, in which like reference characters refer to corresponding parts throughout the several views.

In the drawing

Figure 1 is a vertical section through the signal device,

Fig. 2 is a sectional elevation taken substantially on the line 2—2 of Fig. 1, and Fig. 3 is a transverse horizontal section through the device.

Referring to the drawing in detail, it will be seen that 5 designates a portion of a body of the automobile adjacent the chauffeur wihch is provided with the opening 6 and the passage 7 leading upwardly therefrom. A base plate 8 is mounted on the outside of the portion 5 of the body and has an opening 9 registering with the opening 6. A pair of spaced parallel vertically extending guide flanges 10 project rectangularly from the plate 8 and slidably receive therebetween a rack bar 11 having a pin 12 engaged therein and slidable in the opening or slot 6.

A rod 13 is fixed to the pin 12 and extends through the passage 7 for movement of said pin and rack. The upper end of the rod 13 terminates in a head or knob 14 which should be within easy reach of the chauffeur. A fulcrum pin 17 extends between flanges 10. A signal arm 18 is rockably mounted on the pin 17 and has a gear segment 19 at one end meshing with the teeth of the rack bar 11.

A bull's eye 20 is provided in the outer end of the arm 18. The arm 18 extends through a vertical and longitudinally extending slot or opening 21 provided in the casing 22 which is affixed to the base plate 8. A bracket 23 projects from the base plate 8 and a spring 24 is disposed between the bracket and the upper end of the rack bar 11, being tensioned to normally hold the rack bar in its lowered position with the arm 18 raised and disposed within the slot 21.

It will therefore be seen that by pulling upwardly on the knob 14 the rack bar 11 may be raised through the rod 13 and pin 12 so as to compress the spring 44 and at the same time swing the arm 18 to an extended signalling position.

The device, it will now be seen, is exceedingly simple in its construction, strong and durable, efficient and reliable in its operation, not likely to easily become out of order, easy to manipulate, compact, and otherwise well adapted to the purpose for which it is designed.

The present embodiment of the invention has been disclosed merely by way of example, since in actual practice it attains the features of advantage enumerated as desirable in the statement of the invention and the above description. It will be apparent, however, that numerous changes in the details of construction, and in the combination and arrangement of parts may be resorted to without departing from the spirit or scope of the invention as hereinafter claimed, or sacrificing any of its advantages.

Having thus described my invention, what I claim as new is:—

1. In combination, an automobile body provided with an opening and a passage leading from the opening, a pin movable in the opening, a rod attached to the pin and movable through the passage, a plate on the body having an opening registering with the opening of the body, a rack bar movably mounted on the base plate and connected with the pin, a spring normally holding the rack bar in a predetermined position, a pivoted arm having a rack segment meshing with the rack bar so that upon operation of the rod, the pin will be moved to actuate the rack bar and thereby swing the signal arm and the spring is adapted to return the signal arm to its normal position.

2. A device of the class described including, in combination, a body, a base plate attached to the body and having an opening, flanges rectangularly disposed on the base plate in spaced parallelism with each other, a bar slidable between the flanges and having rack teeth on one edge, a pin extending from the bar through the opening in the base plate, said body provided with an opening for receiving the pin, means for actuating the pin, a bracket extending from the base plate, a spring disposed between the bar and the bracket to normally hold the bar in a predetermined position, gears extending from the flanges, a pin between the ears, an arm pivoted on the pin last mentioned and having an arcuate series of teeth meshing with the teeth of the rack bar, and a casing disposed on the base plate having elongated slots through which the arm extends.

In testimony whereof I affix my signature.

FRED W. SCHALLER.